(12) United States Patent
Almaadeed et al.

(10) Patent No.: US 9,309,392 B2
(45) Date of Patent: Apr. 12, 2016

(54) REINFORCED POLYMER COMPOSITES FROM RECYCLED PLASTIC

(71) Applicants: QATAR UNIVERSITY, Doha (QA); THE UNIVERSITY OF SHEFFIELD, Sheffield (GB); Azza Mohamed Ahmed Helal, Alexandria (EG)

(72) Inventors: Mariam Alali Almaadeed, Al-Ghanim (QA); Nabil Madi, Alexandria (EG); Alma Hodzic, Sheffield (GB); Saravanan Rajendran, Sheffield (GB)

(73) Assignees: Qatar University, Doha (QA); The University of Sheffield, Sheffield (GB)

( * ) Notice: Subject to any disclaimer, the term of this patent is extended or adjusted under 35 U.S.C. 154(b) by 0 days.

(21) Appl. No.: 14/335,867

(22) Filed: Jul. 18, 2014

(65) Prior Publication Data

US 2016/0017131 A1   Jan. 21, 2016

(51) Int. Cl.
*H01B 3/04* (2006.01)
*C08K 3/34* (2006.01)
*C08L 23/06* (2006.01)

(52) U.S. Cl.
CPC ....................................... *C08L 23/06* (2013.01)

(58) Field of Classification Search
CPC ....................................................... C08L 23/06
USPC ....................................................... 524/449
See application file for complete search history.

(56) References Cited

U.S. PATENT DOCUMENTS

| | | | |
|---|---|---|---|
| 5,030,662 A | 7/1991 | Banerjie | |
| 5,886,078 A * | 3/1999 | Sullivan et al. | 524/449 |
| 6,395,342 B1 | 5/2002 | Kadowaki et al. | |
| 6,780,500 B2 | 8/2004 | Dumouchel | |
| 6,804,925 B1 | 10/2004 | McCulloch | |
| 2003/0078331 A1 | 4/2003 | Kim et al. | |
| 2003/0171494 A1 | 9/2003 | Aramaki et al. | |
| 2005/0031848 A1* | 2/2005 | Wilson et al. | 428/323 |
| 2011/0159263 A1 | 6/2011 | Gkinosatis | |
| 2013/0053503 A1 | 2/2013 | Lima et al. | |

\* cited by examiner

*Primary Examiner* — Hui Chin
(74) *Attorney, Agent, or Firm* — Squire Patton Boggs (US) LLP

(57) ABSTRACT

The reinforced polymer composites from recycled plastic are polymer blends made from recycled polymers that are reinforced with glass fibers and mica. In particular, the reinforced polymer composites are blends of recycled low-density polyethylene (LDPE), high-density polyethylene (HDPE), and polypropylene (PP) with a mica filler that are reinforced with glass fibers, where the low-density polyethylene forms between 30 wt % and 35 wt % of the composite, the high-density polyethylene forms between 15 wt % and 17.5 wt % of the composite, the polypropylene forms between 15 wt % and 17.5 wt % of the composite, the glass fibers form between 15 wt % and 40 wt % of the composite, and the mica forms up to 15 wt % of the structural element. The resultant reinforced polymer composite has a relatively high heat deflection temperature, good mechanical properties (such as increased stiffness and strength), improved thermal stability, and is cost effective to manufacture.

17 Claims, 5 Drawing Sheets

REINFORCED POLYMER COMPOSITES FROM RECYCLED PLASTIC

BACKGROUND OF THE INVENTION

1. Field of the Invention

The present invention relates to polymer composites, and particularly to reinforced polymer composites made from recycled plastic.

2. Description of the Related Art

The use of plastic in consumer products is ubiquitous in today's global market. Plastics are used in such products as food packaging and containers (bottled water, milk, soda pop, etc.), appliance housings (televisions, blenders, coffee makers, etc.), automobile components (dashboards, interior door panels, etc.), and numerous other products. Eventually, however, the plastic material must be disposed of after the food or beverage has been consumed, or after the appliance or other product has reached the end of its useful life. The older solution to the disposal of plastic waste was to either incinerate the plastic or to bury the plastic at a landfill. Such disposal methods raised environmental concerns about the emission of greenhouse gases, primarily carbon dioxide, and to a lesser extent, methane. As a result, modern solid waste disposal facilities make provision for recycling plastic waste materials. The plastics are sorted by type, washed, crushed, flaked, and granulated to form resin pellets. However, the uses for recycled plastics are currently somewhat limited. Therefore, there is a need for developing new products and uses for recycled plastic to make commercial recycling of plastic waste materials more attractive.

Thus, reinforced polymer composites made from recycled plastic solving the aforementioned problems are desired.

SUMMARY OF THE INVENTION

The reinforced polymer composites from recycled plastic are polymer blends made from recycled polymers that are reinforced with glass fibers and mica. In particular, the reinforced polymer composites are blends of recycled low-density polyethylene (LDPE), high-density polyethylene (HDPE), and polypropylene (PP) with a mica filler that are reinforced with glass fibers, where the low-density polyethylene forms between 30 wt % and 35 wt % of the composite, the high-density polyethylene forms between 15 wt % and 17.5 wt % of the composite, the polypropylene forms between 15 wt % and 17.5 wt % of the composite, the glass fibers form between 15 wt % and 40 wt % of the composite, and the mica forms up to 15 wt % of the structural element. The resultant reinforced polymer composite has a relatively high heat deflection temperature, good mechanical properties (such as increased stiffness and strength), improved thermal stability, and is cost effective to manufacture, as the polymeric components preferably come from recycled materials. The composite is suitable for use as exterior structural elements, such as fence posts, railroad ties, decking beams and joists, etc.

The composite is made by first dry mixing the low-density polyethylene, high-density polyethylene, polypropylene, glass fibers and mica to form a mixture. This mixture is then fed into a twin screw extruder to extrude the reinforced polymer composite. The extruded strands of reinforced polymer composite are then cooled, pelletized, and subsequently injection molded in a pre-heated mold to form the desired product.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The reinforced polymer composites from recycled plastic are polymer blends made from recycled polymers that are reinforced with glass fibers and mica. In particular, the reinforced polymer composites are blends of recycled low-density polyethylene (LDPE), high-density polyethylene (HDPE), and polypropylene (PP) with a mica filler that are reinforced with glass fibers, where the low-density polyethylene forms between 30 wt % and 35 wt % of the composite, the high-density polyethylene forms between 15 wt % and 17.5 wt % of the composite, the polypropylene forms between 15 wt % and 17.5 wt % of the composite, the glass fibers form between 15 wt % and 40 wt % of the composite, and the mica forms up to 15 wt % of the structural element. The resultant reinforced polymer composite has a relatively high heat deflection temperature, good mechanical properties (such as increased stiffness and strength), improved thermal stability, and is cost effective to manufacture, as the polymeric components preferably come from recycled materials. The composite is suitable for use as exterior structural elements, such as fence posts, railroad ties, decking beams and joists, etc.

Figure 1:
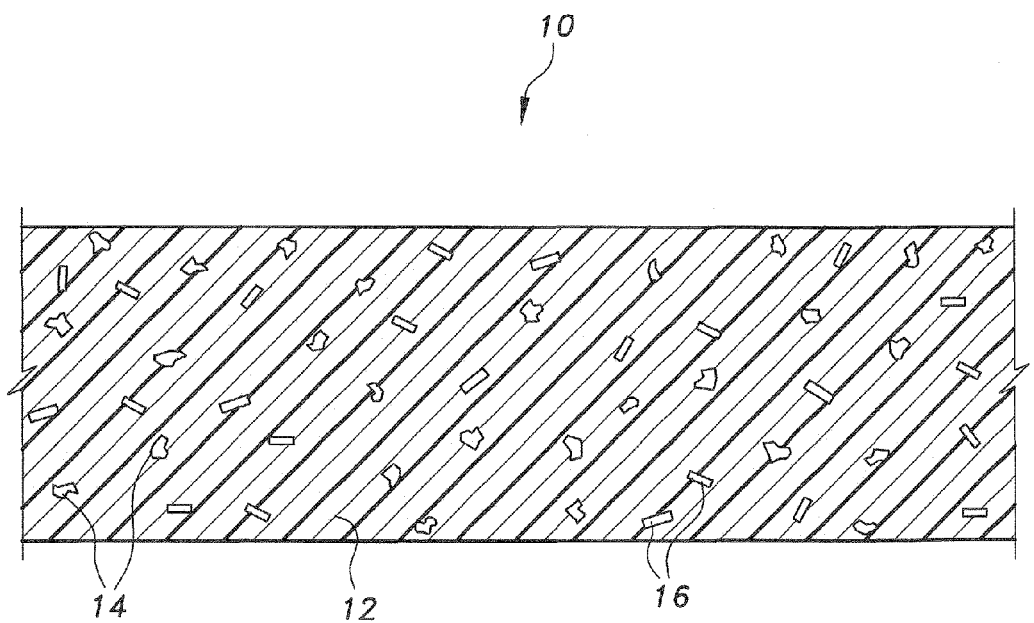
FIG. 1 is a partial side view in section of a reinforced polymer composite from recycled plastic according to the present invention.

It should be understood that any suitable type of structural element may be formed from the reinforced polymer composite, including construction panels, railroad ties, fence posts, etc. As shown below in Table 1, various composites may be made with different blends or proportions of the constituent materials. Referring to FIG. 1, it should be understood that sample composite 10 having the matrix 12 of LDPE, HDPE and PP, with a filler of mica platelets 14 and reinforcing glass fibers 16 is shown for exemplary purposes only. Table 1 below shows seven exemplary blends that may be manufactured with varying grades of mica. The mica is preferably in the form of platelets having high-aspect ratios and diameters in the 1-10 µm range. The glass fibers preferably have diameters of about 14 µm, and may be treated for effective coupling with the thermoplastics.

TABLE 1

Blends for Reinforced Polymer Composites

| Sample # | LDPE (wt %) | HDPE (wt %) | PP (wt %) | Glass Fiber (wt %) | Mica (wt %) |
|---|---|---|---|---|---|
| 1 | 40 | — | 30 | 30 | — |
| 2 | 40 | — | 30 | 15 | 15 |
| 3 | 30 | 15 | 15 | 30 | 10 |
| 4 | 30 | 15 | 15 | 40 | 0 |
| 5 | 30 | 15 | 15 | 30 | 10 |
| 6 | 30 | 15 | 15 | 30 | 10 |
| 7 | 35 | 17.5 | 17.5 | 15 | 15 |

The reinforced polymer composite is made by, first, dry mixing the low-density polyethylene, high-density polyethylene, polypropylene, glass fibers and mica to form a mixture. This mixture is then fed into a twin-screw extruder to extrude the reinforced polymer blend. The mixture is preferably mechanically stirred to homogenously disperse the components in a container and then fed at the throat of the extruder. The twin screw extruder is preferably a 21 mm twin-screw extruder, running at 100 RPM, and having the following temperature profile: 190° C. at the feed, 200° C. in the melting section, and 210° C. at the die. The strands of reinforced polymer blend exiting the extruder are then cooled, pelletized and subsequently injection molded into a pre-heated mold to form the desired product. The mold is preferably pre-heated to a temperature between 60° C. and 70° C. (except for mica-free blends), and injection occurs at a melt temperature between 210° C. and 240° C.

Figure 5:
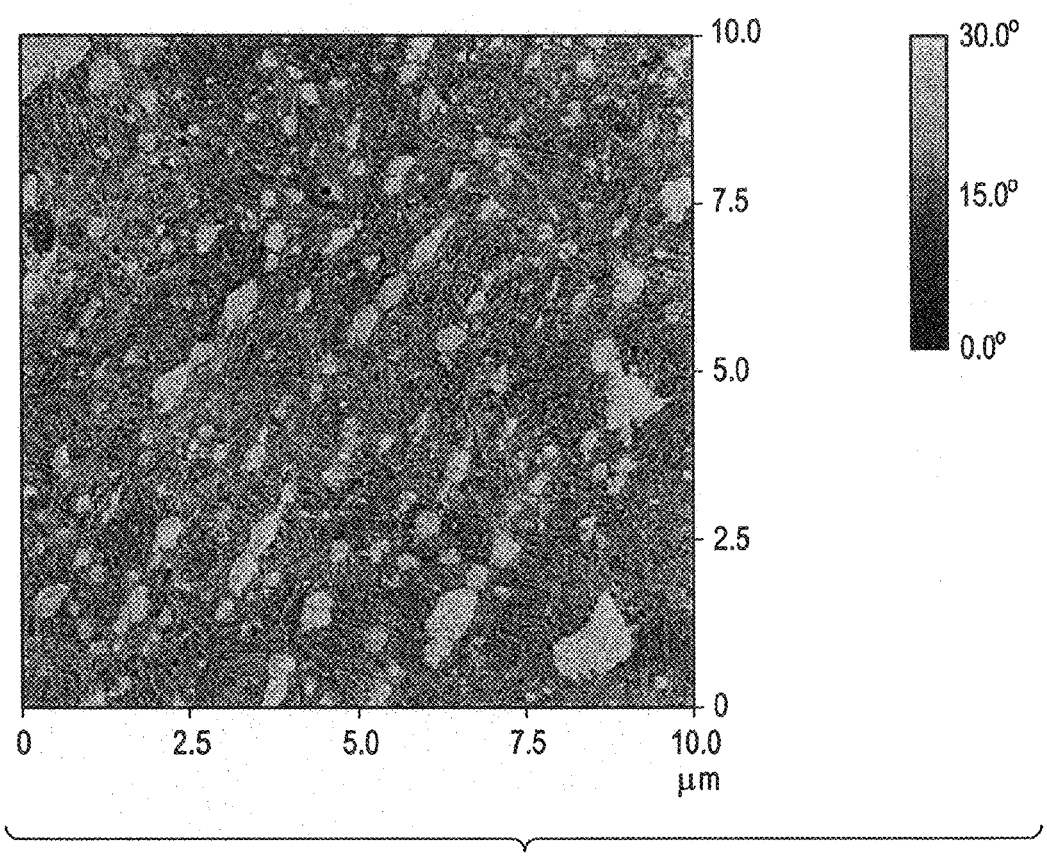
FIG. 5 is an atomic force micrograph of a blend of the reinforced polymer composite from recycled plastic having 75 wt % low-density polyethylene (LDPE) and 25 wt % polypropylene (PP).
Figure 6:
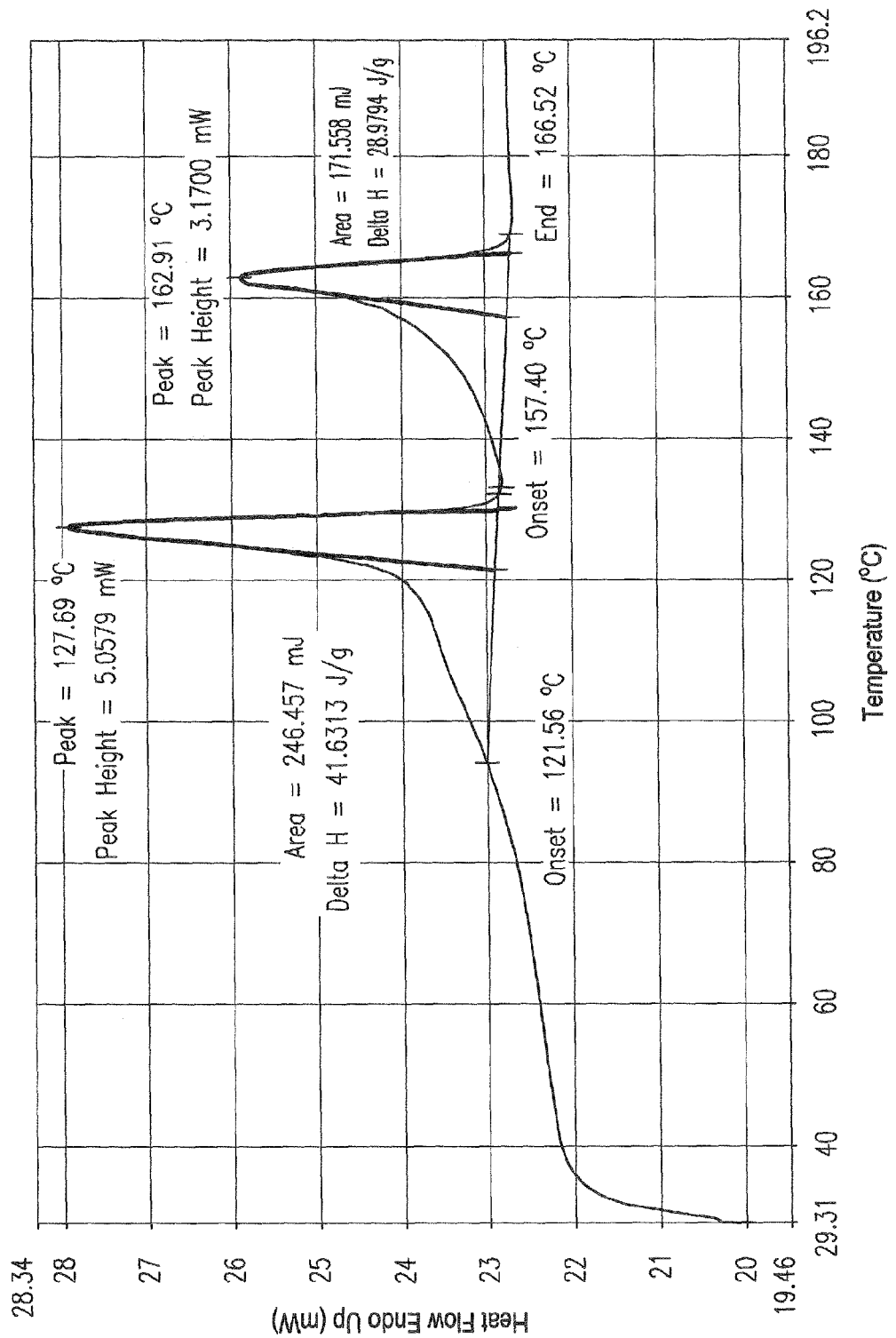
FIG. 6 shows differential scanning calorimetry (DSC) curves for a blend of the reinforced polymer composite from recycled plastic having 60 wt % LDPE/HDPE/PP and 40 wt % glass fiber.

The composites in Table 1 were characterized by atomic force micrography and differential scanning calorimetry. FIG. 5 is an atomic force micrograph of a blend of the reinforced polymer composite from recycled plastic having 75 wt % low-density polyethylene (LDPE) and 25 wt % polypropylene (PP), showing the phase separation of the resultant product. Micrographs of the composites listed in Table 1 were similar to FIG. 5, and showed the same phase separation between polyethylene and polypropylene. FIG. 6 shows differential scanning calorimetry (DSC) curves for Sample 4 of Table 1, with 60 wt % LDPE/HDPE/PP and 40 wt % glass fiber. LDPE has a melting point between 105° C. and 115° C., HDPE has a melting point between 120° C. and 130° C., and a blend of the two may have a melting point somewhere in between. The melting point of PP depends on whether the PP is syndiotactic, isotactic or atactic, but isotactic PP generally has a melting point between 160° and 170° C. The DSC curve of Sample 4 (FIG. 6) shows a sharp peak at 127.69° C., corresponding to polyethylene, and another sharp peak at 162.91° C., corresponding to polypropylene. No intermediate peaks were observed, which indicates that the polyethylene and polypropylene are present in separate phases in the composite mixture (i.e., they are immiscible), and did not react or combine to form new species.

Figure 2:
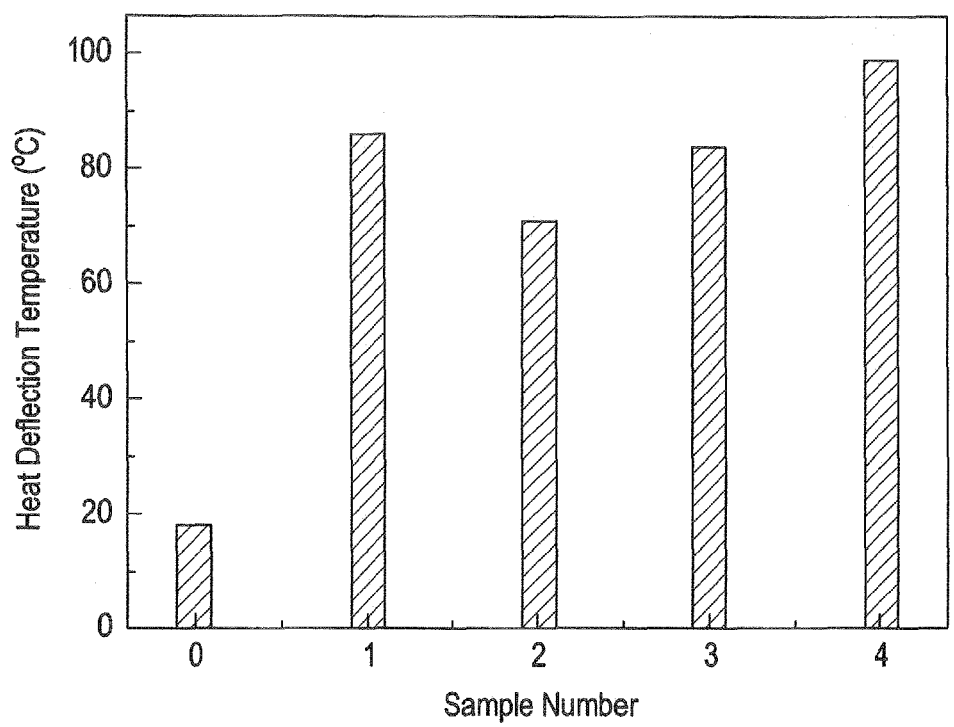
FIG. 2 is a graph comparing heat deflection temperatures for four different blends of the reinforced polymer composite from recycled plastic according to the present invention compared against a control sample of pure recycled LDPE (sample 0).
Figure 3:
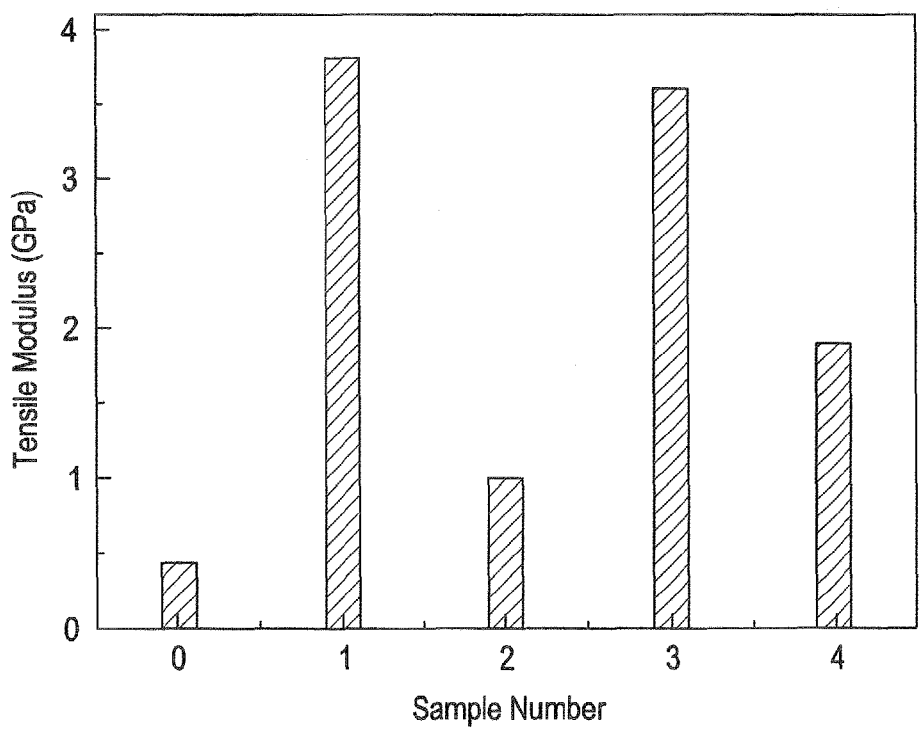
FIG. 3 is a graph comparing the tensile modulus of the four different blends of the reinforced polymer composite from recycled plastic of FIG. 2 compared against a control sample of pure recycled LDPE (sample 0).
Figure 4:
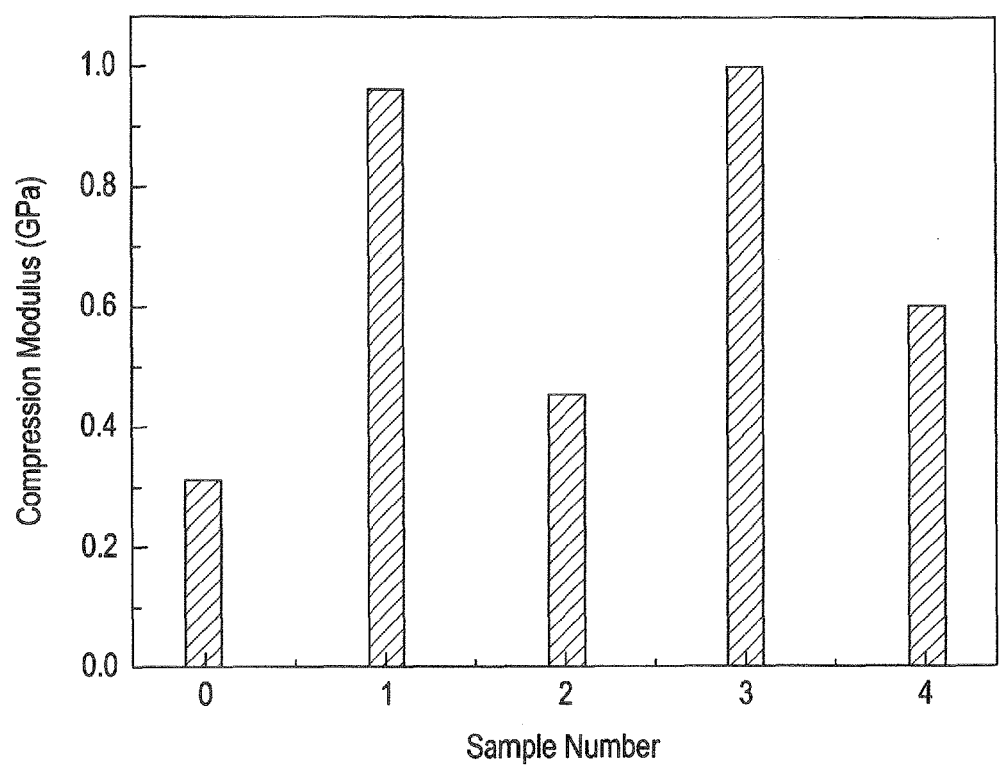
FIG. 4 is a graph comparing the compression modulus of the four different blends of the reinforced polymer composite from recycled plastic of FIG. 2 compared against a control sample of pure recycled LDPE (sample 0).

In FIGS. 2-4, four different blends of the reinforced polymer composites from recycled plastic have been tested for heat deflection temperature, tensile modulus and compression modulus, respectively, and have been compared against a control sample of pure recycled low-density polyethylene (RLDPE) (labeled as sample "0"). The heat deflection temperatures (HDTs) were predicted from dynamic mechanical analyzer (DMA) measurements according to ISO-75-2. It is measured inside a chamber with water or oil as a heating medium. The rectangular samples (80×10×4 mm³) are loaded (264 psi) in a flexural mode in the heating chamber. The temperature was raised at a rate of 2° C./min until the bar deflects 0.34 mm. The HDT is the temperature at which a deflection of 0.34 mm occurs.

For Tension Modulus and Compression Modulus, the flexural properties of the composite blends were evaluated through a dynamic mechanical analyzer in three point bending mode with the thickness to span ratio of 10 and heating rate of 2° C./min. The tensile testing was performed in the Hounsfield testing machine at the speed of 1 mm/min and stiffness values were reported from the strain level of 0.05-0.25%.

Table 2 below shows the particular blends. Although sample 4, which includes no mica, has a higher heat deflection temperature than the other composites, it can be clearly seen that the samples 1, 2 and 3 show a significant increase over that of the control sample. FIGS. 3 and 4 show that samples 1 and 3 have the greatest tensile and compression moduli of all samples, although all of samples 1-4 show a significant improvement in tensile and compression moduli over those of the control sample.

TABLE 2

Sample Blends for Reinforced Polymer Composites

| Sample No. | LDPE/HDPE/PP (wt %) | Glass Fiber (wt %) | Mica (wt %) |
|---|---|---|---|
| 0 | 100 | — | — |
| 1 | 70 | 30 | 0 |
| 2 | 70 | 15 | 15 |
| 3 | 60 | 30 | 10 |
| 4 | 60 | 40 | 0 |

Since polyethylene and polypropylene are immiscible, atomic force microscopy shows phase separation between the polymers. The reinforced polymer composites formed in this manner are shown to exhibit a heat deflection temperature up to 80° C. and good mechanical properties (such as increased stiffness and strength). Thus, the reinforced polymer composites are suitable for use as exterior structural elements, such as fence posts, railroad ties, decking beams and joists, etc.

Once a final product is produced using the exemplary polymer blends, various ASTM standards may apply, including, but not limited to, D2915 (evaluating allowable properties for grades of structural lumber); D6109 (test method for flexural properties of unreinforced and reinforced plastic lumber); D6112 (test methods for compressive and flexural creep and creep-rupture of plastic lumber and shapes); D6341 (test method for determination of thermal expansion of plastic lumber and plastic lumber shapes between −34° C. and 60° C.); and D6662 (standard specification for polyolefin-based plastic lumber decking boards). While we did not actually produce the corresponding components (fence posts, railroad ties, decking beams and joists, etc.), the thermomechanical testing of the samples reported above indicates that the composites should be suitable for making such components.

It is to be understood that the present invention is not limited to the embodiments described above, but encompasses any and all embodiments within the scope of the following claims.

We claim:
1. A reinforced polymer composite, comprising a blend of:
from 30 wt % to 35 wt % recycled low-density polyethylene;

from 15 wt % to 17.5 wt % recycled high-density polyethylene;
from 15 wt % to 17.5 wt % recycled polypropylene;
from 15 wt % to 40 wt % glass fibers; and
from 0 wt % to 15 wt % mica filler;
wherein the mica filler comprises platelets of mica having diameters of between 1 μm and 10 μm.

2. The reinforced polymer composite according to claim 1, wherein the glass fibers each have a diameter of about 14 μm.

3. The reinforced polymer composite according to claim 1, wherein the composite comprises a pellet of the reinforced polymer composite resin.

4. An outdoor construction structural element formed from the reinforced polymer composite of claim 1.

5. The reinforced polymer composite according to claim 1, wherein products molded from the composite have a heat deflection temperature of at least 80° C.

6. A structural element, comprising a molded outdoor construction structural element formed from a reinforced polymer composite having:
from 30 wt % to 35 wt % recycled low-density polyethylene;
from 15 wt % to 17.5 wt % recycled high-density polyethylene;
from 15 wt % to 17.5 wt % recycled polypropylene;
from 15 wt % to 40 wt % glass fibers; and
from 0 wt % to 15 wt % mica filler;
wherein the mica filler comprises platelets of mica having diameters of between 1 μm and 10 μm.

7. The structural element as recited in claim 6, wherein the glass fibers each have a diameter of about 14 μm.

8. The structural element as recited in claim 6, wherein the low-density polyethylene comprises about 30 wt % of the structural element, the high-density polyethylene comprises about 15 wt % of the structural element, the polypropylene comprises about 15 wt % of the structural element, the glass fibers comprise about 30 wt % of the structural element, and the mica comprises about 10 wt % of the structural element.

9. The structural element as recited in claim 6, wherein the low-density polyethylene comprises about 30 wt % of the structural element, the high-density polyethylene comprises about 15 wt % of the structural element, the polypropylene comprises about 15 wt % of the structural element, and the glass fibers comprise about 40 wt % of the structural element, the mica filler being absent.

10. The structural element formed from a reinforced polymer blend as recited in claim 6, wherein the low-density polyethylene comprises about 35 wt % of the structural element, the high-density polyethylene comprises about 17.5 wt % of the structural element, the polypropylene comprises about 17.5 wt % of the structural element, the glass fibers comprise about 15 wt % of the structural element, and the mica comprises about 15 wt % of the structural element.

11. A method of making a reinforced polymer composite from recycled plastic, comprising the steps of:
dry mixing pellets of recycled low-density polyethylene, pellets of recycled high-density polyethylene, pellets of recycled polypropylene, glass fibers and mica to form a mixture having:
from 30 wt % to 35 wt % recycled low-density polyethylene;
from 15 wt % to 17.5 wt % recycled high-density polyethylene;
from 15 wt % to 17.5 wt % recycled polypropylene;
from 15 wt % to 40 wt % glass fibers; and
from 0 wt % to 15 wt % mica filler; wherein the mica filler comprises platelets of mica having diameters of between 1 μm and 10 μm;
feeding the mixture into a twin screw extruder;
extruding strands of the reinforced polymer composite;
cooling the extruded strands; and
forming the cooled, extruded strands into pellets of the reinforced polymer composite.

12. The method of making a reinforced polymer composite according to claim 11, wherein the step of extruding the strands comprises operating the extruder at 100 rpm and at temperatures of 190° C. at the feeder, 200° C. in the melting section, and 210° C. at the die.

13. The method of making a reinforced polymer composite according to claim 11, wherein the step of dry mixing comprises mechanical stirring the mixture in a container to homogeneously disperse the components of the mixture.

14. The method of making a reinforced polymer composite according to claim 13, wherein the step of feeding the mixture comprises feeding the mixture from the container into the extruder at the throat of the extruder.

15. The method of making a reinforced polymer composite according to claim 11, further comprising the step of injection molding pellets of the reinforced polymer composite into a structural construction element.

16. The method of making a reinforced polymer composite according to claim 15, wherein the step of injection molding comprises injection of the reinforced polymer blend into a mold at a melt temperature between 210° C. and 240° C.

17. The method of making a reinforced polymer composite according to claim 16, wherein the step of injection molding further comprises pre-heating the mold to between 60° C. and 70° C.

* * * * *